(12) United States Patent
Redford

(10) Patent No.: US 8,659,827 B2
(45) Date of Patent: Feb. 25, 2014

(54) SPHERICAL ABERRATION CORRECTION FOR AN OPTICAL MICROSCOPE USING A MOVING INFINITY-CONJUGATE RELAY

(75) Inventor: Glen Ivan Redford, Arvada, CO (US)

(73) Assignee: Intelligent Imaging Innovations, Inc., Denver, CO (US)

( * ) Notice: Subject to any disclaimer, the term of this patent is extended or adjusted under 35 U.S.C. 154(b) by 422 days.

(21) Appl. No.: 12/887,869

(22) Filed: Sep. 22, 2010

(65) Prior Publication Data

US 2011/0069381 A1    Mar. 24, 2011

Related U.S. Application Data

(60) Provisional application No. 61/244,561, filed on Sep. 22, 2009.

(51) Int. Cl.
*G02B 27/02*    (2006.01)

(52) U.S. Cl.
USPC .......................................................... 359/434

(58) Field of Classification Search
USPC ................. 359/368–390, 423, 425, 426, 434
See application file for complete search history.

(56) References Cited

U.S. PATENT DOCUMENTS

| | | | |
|---|---|---|---|
| 3,030,861 A | | 4/1962 | Mortimer et al. |
| 4,477,156 A | * | 10/1984 | Gebelein et al. ............... 359/364 |
| 5,054,896 A | | 10/1991 | Margolis |
| 6,473,228 B1 | * | 10/2002 | Toshimitsu .................... 359/368 |
| 6,563,634 B2 | * | 5/2003 | Shimada et al. ............... 359/368 |
| 2003/0063529 A1 | | 4/2003 | Iwata et al. |
| 2005/0207003 A1 | | 9/2005 | Kobayashi |
| 2010/0014155 A1 | * | 1/2010 | Hayashi ......................... 359/380 |
| 2010/0033812 A1 | * | 2/2010 | Fomitchov et al. ............ 359/383 |
| 2010/0172020 A1 | * | 7/2010 | Price et al. ..................... 359/381 |
| 2011/0102887 A1 | * | 5/2011 | Redford ......................... 359/372 |
| 2012/0169864 A1 | * | 7/2012 | Birk ................................ 348/79 |

FOREIGN PATENT DOCUMENTS

JP    2004-311742    11/2004

OTHER PUBLICATIONS

U.S. Appl. No. 12/958,165, filed Dec. 1, 2010, Redford.
European Search Report for European Patent Application No. 10010141.9, dated Feb. 23, 2011, 7 pages.
European Search Report for European Patent Application No. 10015589.4, dated Mar. 18, 2011, 4 pages.
Official Action for U.S. Appl. No. 12/958,165 mailed Dec. 20, 2012.
Notice of Allowance for U.S. Appl. No. 12/958,165 mailed Sep. 16, 2013.

* cited by examiner

*Primary Examiner* — Frank Font
(74) *Attorney, Agent, or Firm* — Jason H. Vick; Sheridan Ross, PC

(57) ABSTRACT

An infinity-conjugate lens relay with a moving first lens is used to select a plane of interest from an image volume. This plane can be selected so that the image is corrected for spherical aberration due to non-ideal imaging conditions. This effectively will allow for deeper, corrected imaging for high power microscopes. Using an infinity-conjugate relay, this device has an ideal "bypass" mode for regular imaging without correction. The device also utilizes software that automatically controls the device for correcting live images.

20 Claims, 6 Drawing Sheets

SPHERICAL ABERRATION CORRECTION FOR AN OPTICAL MICROSCOPE USING A MOVING INFINITY-CONJUGATE RELAY

RELATED APPLICATION DATA

This application claims the benefit of and priority under 35 U.S.C. §119(e) to U.S. Patent Application No. 61/244,561, filed Sep. 22, 2009, entitled "Spherical Aberration Correction for an Optical Microscope using a Moving Infinity-Conjugate Relay," which is incorporated herein by reference in its entirety.

FIELD

An exemplary aspect of this invention generally relates to spherical aberration correction in optical microscopes. More specifically, an exemplary embodiment of this invention relates to a spherical aberration correction device. Even more specifically, an exemplary embodiment of the invention relates to a spherical aberration correction device using an infinity-conjugate relay. Even more specifically, an exemplary embodiment of the invention relates to an automated spherical aberration correction device.

BACKGROUND

High-power optical microscopes can use objectives with large numerical apertures (NA) resulting in high resolution imaging. In the case of oil or water immersion objectives these NAs can exceed 1.0. In any optical system, the first aberration that causes loss of signal and resolution is spherical aberration. Spherical aberration is the artifact in an imaging system caused by the inability of the optical system to focus axial and off-axis light from a point source to a single point. Modern objectives are highly corrected for spherical aberration, using multiple lens elements to eliminate the effect. However, these objectives are corrected only for a single ideal situation (e.g., for a specific cover glass thickness for samples on the cover glass). In practice, moving deeper into the sample introduces spherical aberration and is usually the limiting factor in deep imaging with these objectives. In addition, great variability in cover glass thickness from the manufacturer can cause significant losses of signal for imaging in what should be the ideal situation.

SUMMARY

A common optical microscope configuration when simplified comprises an infinity objective and a tube lens. A sample is imaged a specific distance from the objective and at the back focal length of the tube lens the magnified image is created. This image is then recorded by a camera or other imaging device. Most objectives are made so that points off the axis and in the focal plane are correctly relayed to the plane of the image. Points out of the focal plane (above or below) are also relayed to images before or after the measured image. These points, however, are not recorded because the imaging device only records a single plane. Effectively an "image volume" is created of the sample after the tube lens. It would be possible to capture three-dimensional data by moving the imaging device through the image volume.

Because points above and below the focal plane are no longer at the specified ideal location for the objective, spherical aberration will be introduced for these points. Consecutively worse spherical aberration will occur as the imaging device is moved away from the "ideal" image plane. Spherical aberration has a "direction" to it in that the point-spread-function (PSF) is distorted along the z-axis in one direction or another. Thus one can assign a positive and negative spherical aberration of varying degree.

When the sample being imaged is no longer at the specified ideal situation for the given objective, the image of the "ideal" focal plane will have spherical aberration. The true ideal focal plane (with no spherical aberration) will be located above or below the original plane. As the sample moves further from the ideal condition, the spherical aberration free image will move further from the original plane. For any of these conditions, one should be able to move the imaging device to the plane in the focal volume that represents the spherical aberration free focal plane. Thus by changing the location of the imaging device, one could correct for spherical aberration across a broad range of samples and imaging conditions. In most situations it is impractical to move the usually bulky imaging device, so a variable optical relay can be employed to change the plane of the image volume that is recorded.

Accordingly, one exemplary embodiment of the invention is directed toward a moving optical relay system for selecting a plane of interest from the focal volume. If this relay were to be motorized as well as the focus of the microscope, one could in an automated fashion correct for the spherical aberration in the current sample plane. Typically this would involve software to select the position of the relay based on the quality of the image.

Primarily, there are two sources of spherical aberration in a given sample. The first is due to the conditions of the sample—usually variations in the thickness of the cover glass. This source of aberration is usually invariant over the sample, but is very hard to predict. To correct for this, the sample must be directly measured and the best plane of interest of the image volume chosen based on the measurement of the sample at several planes. The second source of aberration is due to imaging deeper into the sample. The spherical aberration varies with depth for any given sample medium for any given objective in a known manner. An algorithm can be developed that will give the plane of the image volume needed for any given depth of the sample. The end result is that one has a curve that represents the change in plane location vs. sample depth and a random offset to this curve caused by the sample. The offset can be found empirically and then any depth in the sample can be corrected using the calculated curve.

One exemplary variable relay system involves two positive lenses. The first lens is placed the distance of its focal length from the image plane. By moving this lens, the desired image plane can be selected. The second lens is placed its focal length from the detector. The image plane that is the focal length of the first lens away will be relayed at infinity to the second lens which images it onto the detector. In this way, the detector can be fixed in its location, while only one lens element needs to be moved. Ideally the distance between the two lenses is equal to the sum of their focal lengths. As the first lens moves, this ideal situation will change, with the primary consequence being that the second lens must be of greater diameter. If positioned correctly and if the two lenses are equal, a "zero" point can be established where the original focal plane is imaged with no additional magnification or distortion.

In accordance with another exemplary embodiment, one could use a fast, accurate linear motion device to move the first lens. This would allow the application where the position of the lens is continuously varied as the imaging condition varies (usually by moving deeper in the sample). For example this could allow three-dimensional imaging where each plane in z is individually corrected for spherical aberration. In practice such a device would allow for deeper imaging into a sample.

If the linear motion device were fast enough to perform the required motion in under the transfer time of the detector (for many scientific cameras this time is near 10 ms), there would be no performance loss while correcting the spherical aberration for each image.

According to one exemplary embodiment, the linear motion device is a moving coil actuator which can provide the speed and precision necessary.

The exemplary apparatus can comprise a two lens relay where the first lens can move relative to the other and a means, such as a motor for moving the first lens.

This apparatus when combined with an optical microscope and an imaging device would provide a way to correct for spherical aberration in an automated fashion.

This device has a first exemplary advantage that when it is in the "zero" position it effectively has no effect on the image—as if the device were not present. This allows the microscope to be used in a normal fashion when spherical aberration correction is not desired or needed. Because this device can also be made with fast motion control, it will allow for spherical aberration correction without affecting the system performance.

Aspects of the invention are thus directed toward spherical aberration correction in optical microscopes.

Aspects of the invention are also directed toward automatic spherical aberration correction in optical microscopes.

Still further aspects of the invention are directed toward a spherical aberration correction device.

Even further aspects of the invention are directed toward a spherical aberration correction device using an infinity-conjugate relay.

Still further aspects of the invention are directed toward a motorized relay lens system for selecting a plane from an image volume.

Even further aspects of the invention are directed toward a fast linear motion device such that the desired motion can happen in less than the frame transfer time of a scientific camera.

Even further aspects of the invention are directed toward automated control and software for the device.

Still further aspects of the invention relate to an apparatus for a spherical aberration correction system including an infinity-conjugate relay system with two lenses, means for moving the first lens along the optical axis, means for controlling the motion of the first lens to select the desired image plane and means for controlling the motion of the first lens while imaging.

The aspect above, where the first lens is motorized.

Any of the above aspects, where the first lens is motorized by using a moving coil actuator.

Any of the above aspects, where the first lens is motorized using a stepper-motor.

Any of the above aspects, where the first lens is moved using a manual focusing device.

Any of the above aspects, where the motorization control device is synchronized with the detector.

Any of the above aspects, where the means for moving the first lens can do so in under the transfer time of the imaging camera.

Any of the above aspects, where instead of an imaging relay device, the detector itself is moved to select the desired image plane.

Any of the above aspects, where the apparatus is combined with an optical microscope.

Any of the above aspects, where the apparatus is combined with an electronic imaging device such as a camera.

Any of the above aspects, where the apparatus is combined with a scanning microscope.

Any of the above aspects, where the scanning microscope is a confocal microscope.

Any of the above aspects, where the scanning microscope is a two-photon microscope.

Any of the above aspects, where the apparatus has a "zero" mode where the effective image is unaltered from the image were the apparatus not present.

Any of the above aspects, where the apparatus is automated and controlled with a computer program.

Any of the above aspects, where the computer program uses a calculated curve to determine the position of the first lens for a given sample depth.

These and other features and advantages of this invention are described and, or are apparent from, the following detailed description of the exemplary embodiment.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to microscopes, imaging systems, and associated components. However, it should be appreciated that, in general, known components will not be described in detail. For purposes of explanation, numerous details are set forth in order to provide a thorough understanding of the present invention. It should be appreciated however that the present invention may be practiced in a variety of ways beyond the specific details set forth herein.

Figure 1:
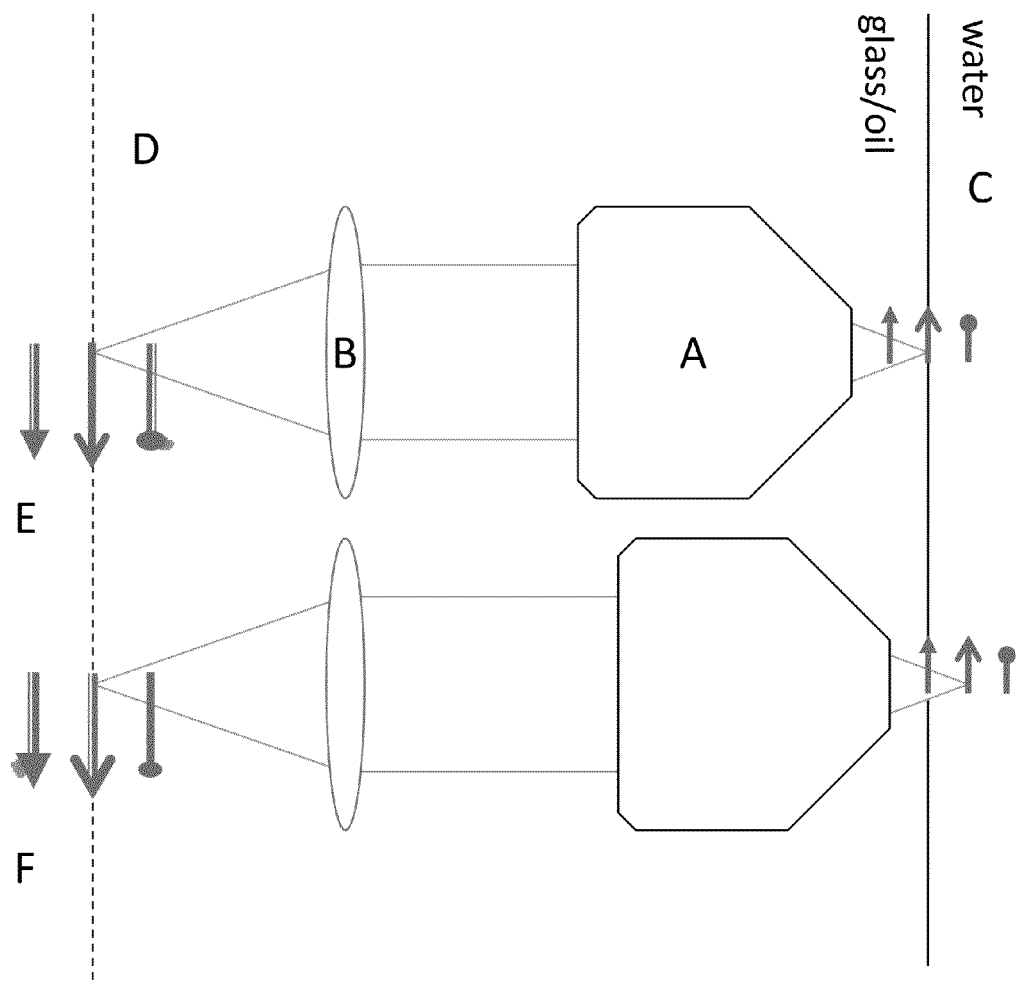
FIG. 1 illustrates the basic concept of the focal volume and how it relates to spherical aberration.

FIG. 1 illustrates the concept of a focal volume as formed by an infinity objective. It also shows how spherical aberration is related to the focal volume. Inside a typical microscope there is an objective A which relays images at infinity to a tube lens B. If this is an oil objective, then typically there would be an interface C between the oil and the sample which is often aqueous in biological research—Typically this is a cover glass. When the sample of interest is on this interface, then the objective's ideal conditions are met—at the imaged plane D of the focal volume E, there is no spherical aberration. There is positive and negative spherical aberration before and behind this plane. When imaging deeper into the sample, ideal conditions are not met, and the imaged plane F of the focal volume is no longer aberration free. There exists, however a plane where there is no spherical aberration before or after the imaged plane.

Figure 2:
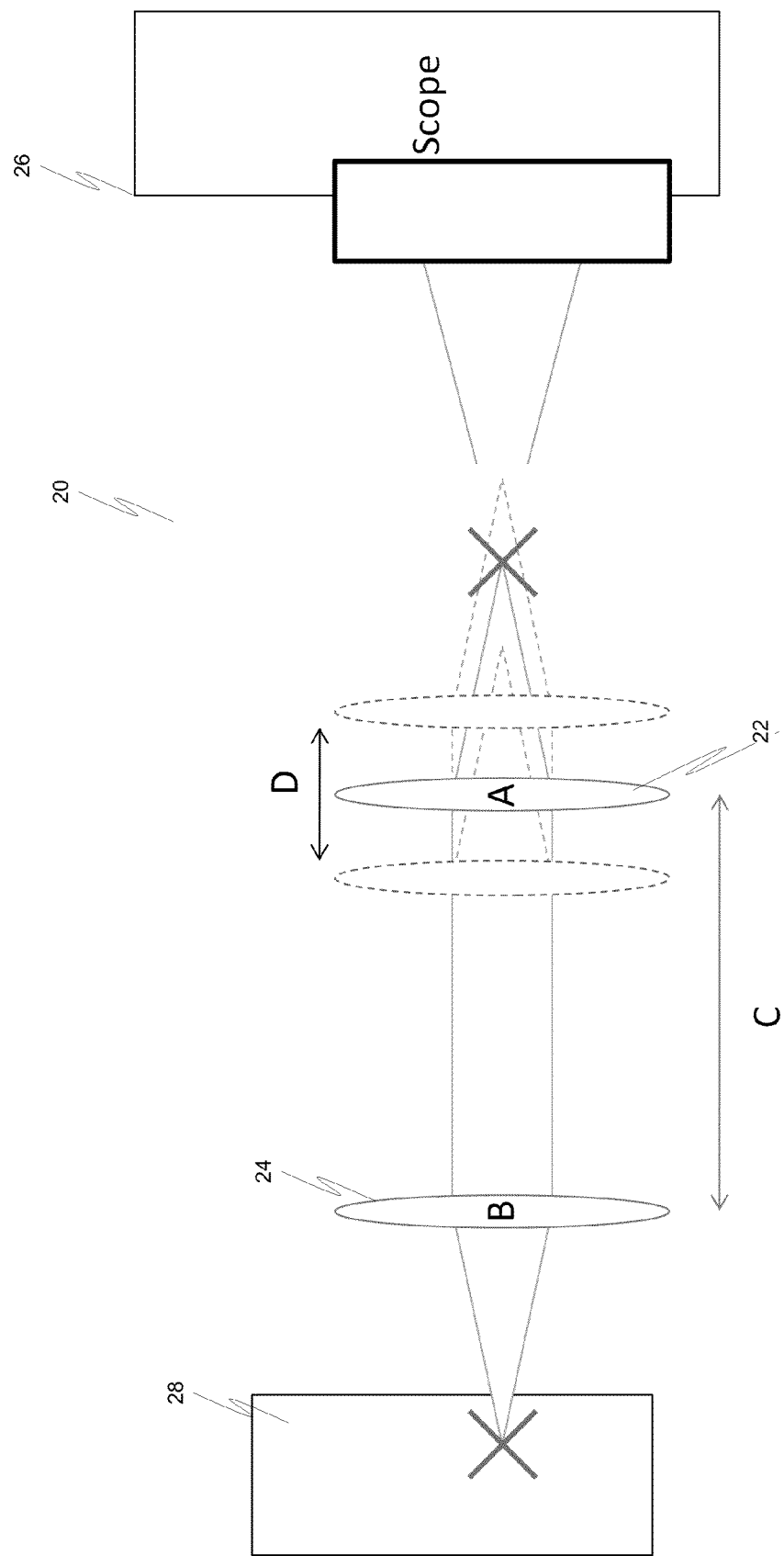
FIG. 2 illustrates an exemplary lens system using an infinity conjugate relay with a moving front lens as a spherical aberration correction device.

FIG. 2 illustrates an exemplary optical system 20 according to this invention. The optics consists of a front lens A (22) and a back lens B (24) that are placed between the microscope 26 and imaging device (e.g., camera 28) such that they form an infinity-conjugate relay. Ideally, the distance between the lenses C is the sum of the focal lengths of the lenses. This forms a simple relay of the image from the tube lens onto the imaging device, that is, there is no introduced change into the image as if the device were not present. The front lens can move distance D, allowing selection of a specific plane within the focal volume.

Figure 3:
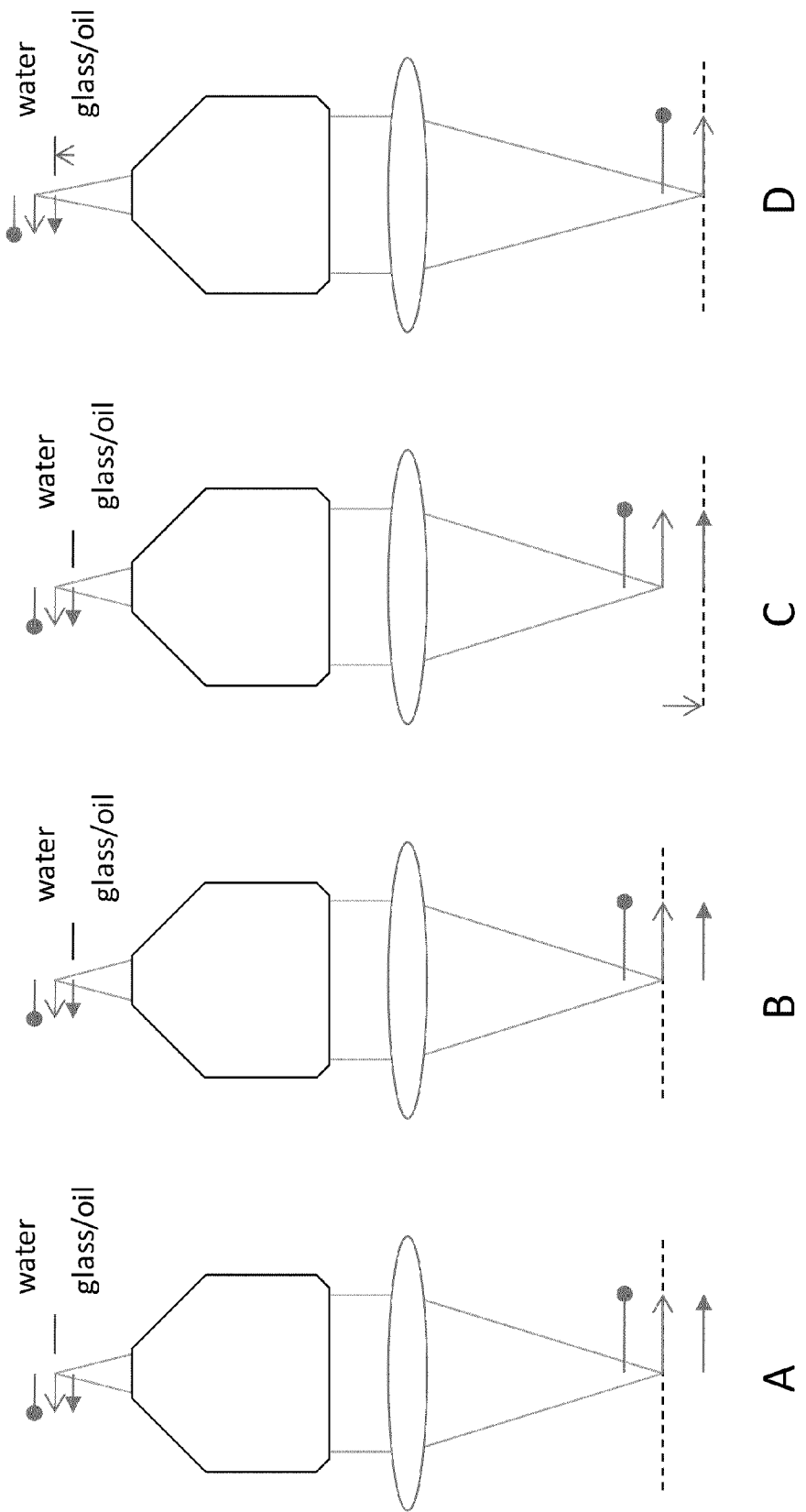
FIG. 3 illustrates how spherical aberration can be corrected by selection of an appropriate plane in the image volume.

FIG. 3 illustrates the process of correcting spherical aberration. When the sample is at the ideal location A, the imaged plane is aberration free. When imaging in a non-ideal situation B, the imaged plane is no longer aberration free. The imaged plane is changed C to the plane that is aberration free using the device according to this invention. The focus D is changed to re-focus on the sample of interest, but now with no aberration.

Figure 4:
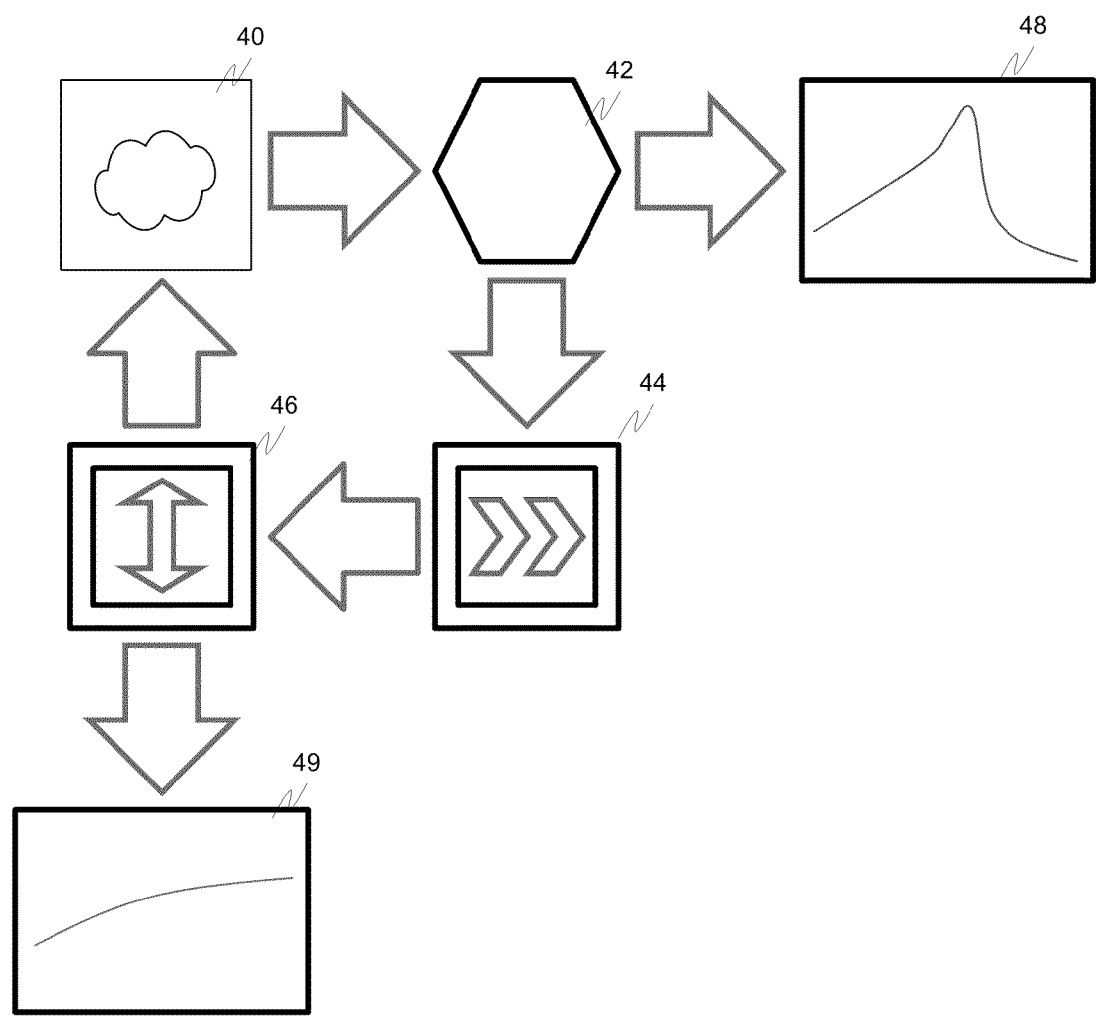
FIG. 4 illustrates an exemplary software and hardware control flow for finding the desired plane in the image volume.

FIG. 4 illustrates the software and hardware control for finding the plane in the focal volume that is least aberrated. The digital image of the sample of interest 40 is put through an algorithm 42 which generates a fitness number such that a higher fitness number represents a less aberrated image. The position of the spherical aberration correction device is then changed in control process 44 that can be realized by, for example, a control module (not shown). This causes the sample of interest to be no longer in focus. The focus of the microscope is then changed until the sample is back into focus in process 46. Another digital image is then taken and the process is repeated. A curve for fitness vs. spherical aberration correction device position 48 is then generated along with the curve for z position vs. device position 49. The correct position of the spherical aberration correction device is the position when the curve of fitness 48 has a maximum.

Figure 5:
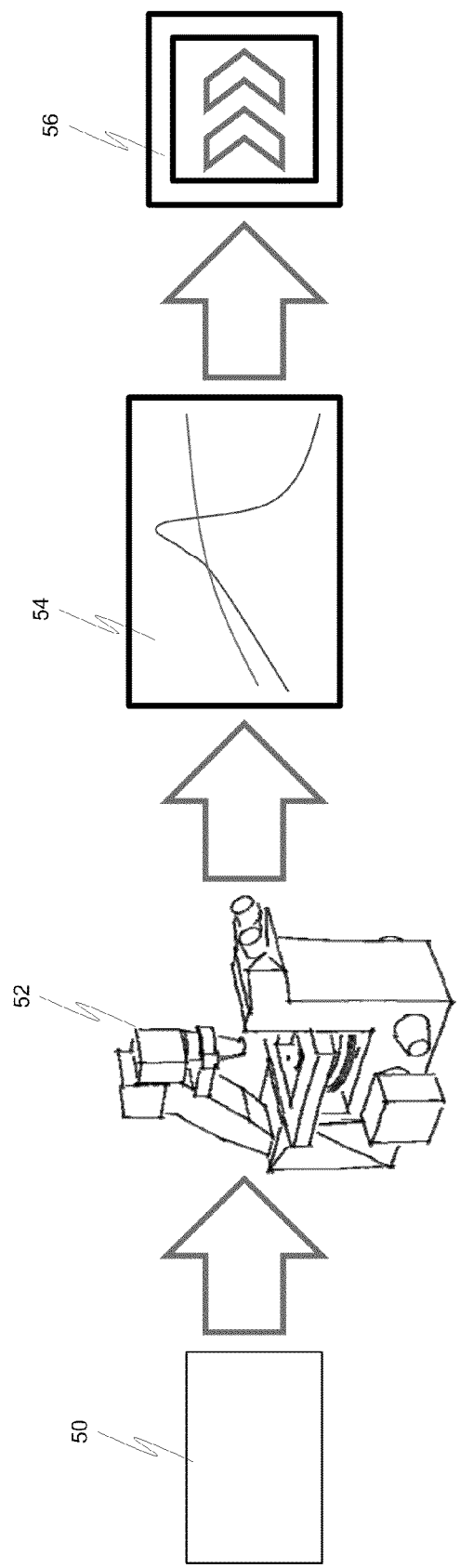
FIG. 5 illustrates an exemplary software and hardware control flow for automatically correcting for spherical aberration during live imaging.

FIG. 5 illustrates the software and hardware control for automatically correcting the spherical aberration during imaging. The imaging device 50 reports electronically that it is done with the current image. While the image is being transferred, the microscope 52 performs any required automation such as changing the z position of the objective. The microscope then reports the current z position to, for example a controller, such as a computer-based controller, for example a synchronization module. From the data acquired previously, the correct spherical aberration device position and the corresponding change to the microscope focus can be calculated by process 54. The device is then moved in step 56 before the next image is begun.

Figure 6:
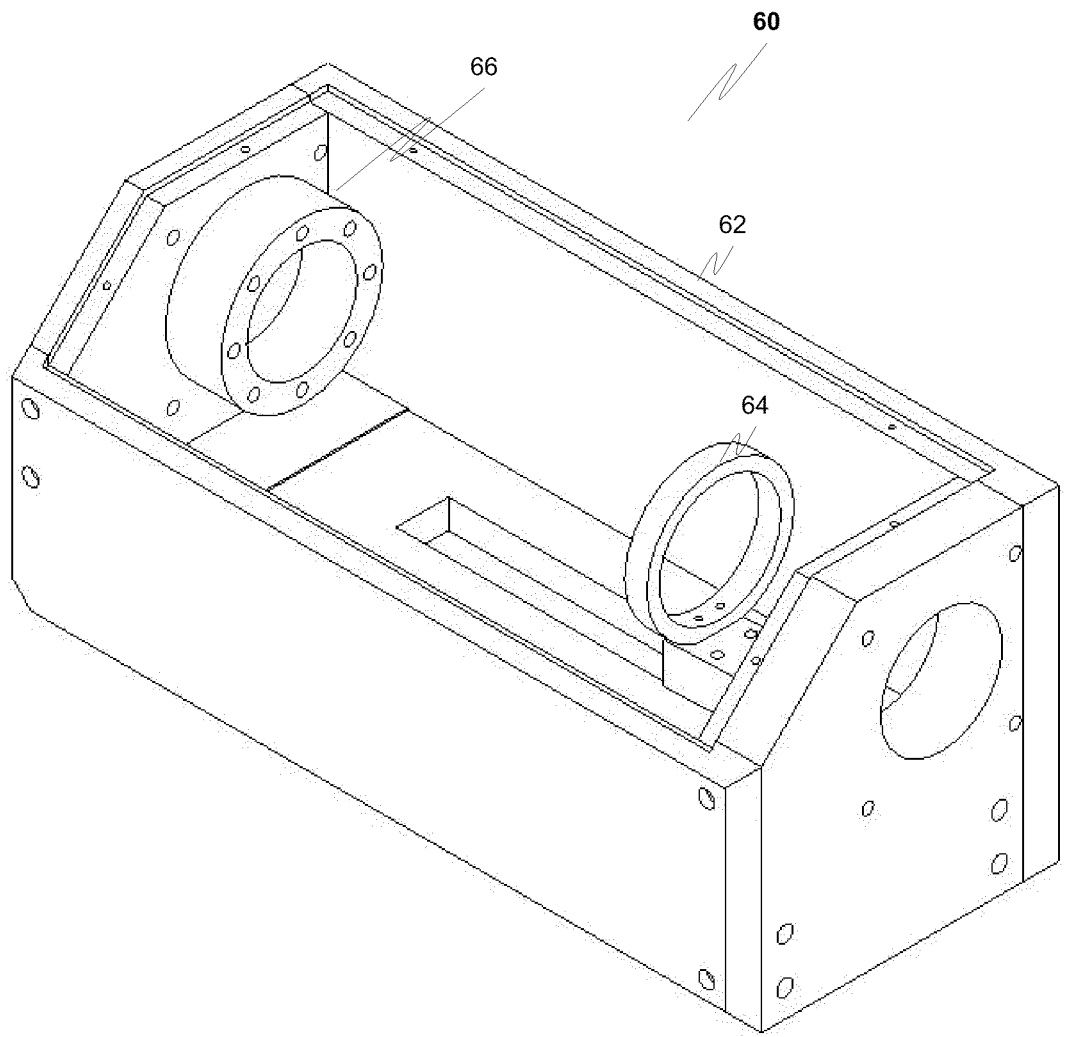
FIG. 6 illustrates an environmental perspective view of an exemplary embodiment of a spherical aberration correction device.

FIG. 6 illustrates an exemplary embodiment of a spherical aberration correction device 62. The top panel 62 can optionally be made transparent so the insides can be seen. The movable front lens is located on a fast linear stage 64 with associated motor and control circuit (not shown). The back lens 66 is located near the output of the device.

The exemplary techniques illustrated herein are not limited to the specifically illustrated embodiments but can also be utilized with the other exemplary embodiments and each described feature is individually and separately claimable.

The systems of this invention also can cooperate and interface with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol.

Furthermore, the disclosed system may use control methods and graphical user interfaces that may be readily implemented in software using object or object-oriented software development environments that provide portable source code that can be used on a variety of computer or workstation platforms that include a processor and memory. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with the present invention a spherical aberration correction device. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A spherical aberration correction device comprising: an imaging relay system that selects a desired plane from an image volume and relays that plane to an imaging device, the imaging relay system including an infinity conjugate relay system having a first and a second lens, wherein the first lens is movable relative to a second lens that is fixed, and the lenses are located between a microscope and the imaging device.

2. The system of claim 1, further comprising wherein the imaging device is a camera.

3. The system of claim 2, further comprising a motorized first lens.

4. The system of claim 3, further comprising a moving coil actuator adapted to move the first lens.

5. The system of claim 3, further comprising a motion control system that controls focus of the microscope.

6. The system of claim 5, further comprising a synchronization module adapted to synchronize the microscope and the motion control device.

7. The system of claim 1, further comprising of a controller adapted to automatically adjust the first lens to correct for spherical aberration.

8. The system of claim 7, wherein the controller adjusts for spherical aberration based only on image data.

9. The system of claim 3, wherein motion can occur during a transfer time of the imaging device.

10. The system of claim 3, wherein the motion can occur during imaging.

11. The system of claim 1, wherein spherical aberration is corrected for each plane individually in a three-dimensional data set as the first lens is moved.

12. The system of claim 7, wherein the controller further uses a stored equation or numerical formula to adjust the spherical aberration correction for any given sample depth.

13. The system of claim 12, wherein the controller automatically adjusts the correction during live imaging.

14. The system of claim 12, wherein the controller also uses an empirically derived offset to the correction to account for the sample conditions.

15. A spherical aberration correction device in a microscope comprising:
    means for selecting a desired plane from an image volume; and
    means for relaying that plane to an imaging device, wherein the means for selecting includes a means for moving a first lens relative to a second lens that is fixed to correct for spherical aberration, wherein the lenses are located between the microscope and the imaging device.

16. The system of claim 15, wherein the imaging device is a camera.

17. The system of claim 16, further comprising means for automatically focusing the microscope.

18. The system of claim 15, wherein a moving coil actuator is used to move the first lens.

19. The system of claim 15, further comprising a motion control system adapted to focus the microscope.

20. A microscope comprising:
    an imaging device;
    an infinity conjugate relay system having a first and a second lens between the microscope and the imaging device, wherein the first lens is movable relative to a second lens that is fixed, wherein the infinity conjugate relay system selects a plane of interest from a focal volume; and
    a motor for the infinity conjugate relay system is adapted to move the first lens as well as focus the microscope to automatically correct for spherical aberration in a sample plane.

* * * * *